United States Patent [19]

Nozawa

[11] Patent Number: 4,731,625
[45] Date of Patent: Mar. 15, 1988

[54] FINDER OPTICAL SYSTEM FOR A SINGLE-LENS REFLEX CAMERA
[75] Inventor: Toshihide Nozawa, Tokyo, Japan
[73] Assignee: Olympus Optical Co., Ltd., Tokyo, Japan
[21] Appl. No.: 38,789
[22] Filed: Apr. 15, 1987
[30] Foreign Application Priority Data
 Apr. 21, 1986 [JP] Japan .................. 61-91762
[51] Int. Cl.$^4$ ............ G03B 13/06; G03B 19/12
[52] U.S. Cl. ............................ 354/155
[58] Field of Search .................. 354/155, 225
[56] References Cited
 U.S. PATENT DOCUMENTS
 4,437,750  3/1984  Ikari .................. 354/155

Primary Examiner—Michael L. Gellner
Attorney, Agent, or Firm—Cushman, Darby & Cushman

[57] ABSTRACT

A finder optical system for a single-lens reflex camera comprising a pentagonal roof prism, and an eyepiece which comprises a negative lens and a positive lens and which is arranged on the light exiting side of the pentagonal roof prism, the finder optical system being arranged that an aspherical surface is adopted for the surface on the image side of the negative lens so as to thereby arrange that, even when a small-sized pentagonal roof prism is used, a satisfactorily long eye relief is ensured the magnification of the finder is not decreased and, at the same time, aberrations are corrected favorably.

6 Claims, 4 Drawing Figures

FINDER OPTICAL SYSTEM FOR A SINGLE-LENS REFLEX CAMERA

BACKGROUND OF THE INVENTION (a) Field of the invention

The present invention relates to a finder optical system for a single-lens reflex camera.

(b) Description of the prior art

In recent years, single-lens reflex cameras are being made small in size and, in relation thereto, pentagonal roof prisms in finder optical systems are also being made small.

Generally, in finder optical systems, the point where the ray coming from the point of the highest image height intersects with the optical axis after going out from the pentagonal roof prism and being refracted by the eyepiece is the eye point of the finder optical system. When the pentagonal roof prism is made smaller, the effective areas of reflecting surfaces and light exiting surfaces thereof become small, and the height of the ray which goes out from the pentagonal roof prism becomes low. Therefore, the eye point necessarily comes to a position near the prism.

As a result, the eye relief (the distance from the eyepiece to the eye point) becomes short. A finder with a short eye relief is very inconvenient for use especially for a person who wears spectacles. In the above-mentioned case, the eye relief can be kept long to some extent when the refractive power of the eyepiece is made weak. In that case, however, the magnification of the finder becomes low, and this is not desirable.

To prevent the above-mentioned decrease in the magnification, a known finder optical system is arranged that the eyepiece thereof comprises a negative lens and a positive lens in the order from the object side, refractive powers of respective lenses are made strong so as to thereby shift the rear principal point rearward and, at the same time, the eyepiece as a whole is put to a position as close as possible to the light exiting surface of the pentagonal roof prism so that the ray enters the eyepiece at a position as high as possible, said known finder optical system being thereby arranged that the eye relief thereof is made long and, at the same time, the magnification of the finder is kept high to some extent.

However, when the refractive powers of respective lenses are made strong as described in the above, aberrations necessarily increase and, especially, it becomes difficult to correct astigmatism and distortion.

SUMMARY OF THE INVENTION

It is, therefore, a primary object of the present invention to provide a finder optical system for a single-lens reflex camera arranged that, even when the pentagonal roof prism is made small, the eye relief is kept long without decreasing the magnification of the finder and, at the same time, aberrations are corrected favourably.

The finder optical system for a single-lens reflex camera according to the present invention comprises a pentagonal roof prism, and an eyepiece which comprises a negative lens and a positive lens in the order from the object side and which is arranged on the light exiting side of said pentagonal roof prism, the surface on the image side of said negative lens being arranged as an aspherical surface.

In case of a finder optical system wherein an eyepiece, which comprises a negative lens and a positive lens, is provided on the light exiting side of the prism, astigmatism and distortion become unfavourable when the refractive powers of respective lenses are made strong. This is because the absolute values of negative aberrations to be caused by the positive lens become larger than those of positive aberrations to be caused by the negative lens. Therefore, the aspherical surface is adopted in order to correct the above-mentioned unbalance in the values of aberrations. In the finder optical system according to the present invention, the surface on the image side of the negative lens, which constitutes the eyepiece, is arranged as an aspherical surface whose radius of curvature becomes smaller toward portions thereof farther from the optical axis so as to thereby increase the values of astigmatism and distortion to be caused at the surface on the image side of the negative lens so that aberrations caused by the negative lens and aberrations caused by the positive lens offset each other in a well balanced state and, consequently, aberrations of the finder optical system as a whole are thereby corrected favourably.

Said aspherical surface to be adopted for the surface on the image side of the negative lens is expressed by the formula shown below when the x axis is traced in the direction of the optical axis and the y axis is traced in a plane perpendicular to the optical axis taking the intersecting point between the aspherical surface and optical axis as the origin and taking the light advancing direction as "plus":

$$x = \frac{Cy^2}{1 + \sqrt{1 - C^2 y^2}} + Ey^4 + Fy^6 + Gy^8 + Hy^{10}$$

where, $C = 1/r_4$ (where, reference symbol $r_4$ represents the radius of curvature of the vertex portion of the aspherical surface), and reference symbols E, F, G, H, . . . respectively represent the coefficients of aspherical surface of the fourth order, sixth order, eighth order, tenth order and so on.

Besides, to attain the object of the present invention, it is preferable to arrange that the finder optical system according to the present invention fulfills the following conditions:

(1) $1.0 < |f/f_1| < 2.3$ (2) $1.8 < f/f_2 < 3.0$ where, reference symbol f represents the focal length of the finder optical system as a whole, reference symbol $f_1$ represents the focal length of the negative lens constituting the eyepiece, and reference symbol $f_2$ represents the focal length of the positive lens constituting the eyepiece.

The condition (1) defines the refractive power of the negative lens, and the condition (2) defines the refractive power of the positive lens. When the refractive power of the negative lens and/or the refractive power of the positive lens is made strong to the degree that $|f/f_1|$ becomes larger than the upper limit of the condition (1) and/or $f/f_2$ becomes larger that the upper limit of the condition (2), it is advantageous for making the eye relief long. However, astigmatism and distortion become unfavourable, and it is difficult to correct them. When the refractive power of the negative lens and/or the refractive power of the positive lens is made weak to the degree that $|f/f_1|$ becomes smaller than the lower limit of the condition (1) and/or $f/f_2$ becomes smaller than the lower limit of the condition (2), it is difficult to make the eye relief satisfactorily long.

DETAILED DESCRIPTION OF THE PREFERRED EMBODIMENTS

Now, the preferred embodiments of the finder optical system for a single-lens reflex camera according to the present invention are described in detail below.

Figure 1:
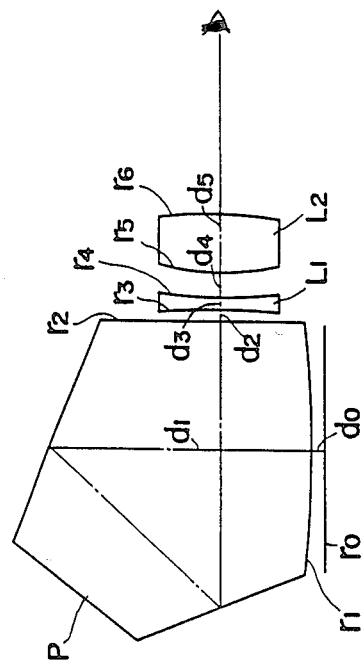
FIG. 1 shows a sectional view illustrating the configuration of the pentagonal roof prism and lenses in the preferred embodiments of the finder optical system for a single-lens reflex camera according to the present invention.

That is, FIG. 1 shows a sectional view illustrating the configuration of the pentagonal roof prism and lenses in the preferred embodiments of the finder optical system according to the present invention. As shown in said figure, the light entrance surface $r_1$ of the pentagonal roof prism P is formed as a convex surface with weak curvature. An eyepiece comprising a negative lens $L_1$ and a positive lens $L_2$ is arranged on the light exiting side of the pentagonal roof prism P, and the surface on the image side ($r_4$) of the negative lens $L_1$ is arranged as an aspherical surface.

Besides, said preferred embodiments respectively have the numerical data shown below.

```
                    Embodiment 1
r_0 = ∞
d_0 = 1.12
r_1 = 140.0
d_1 = 79.65        n_1 = 1.51633        ν_1 = 64.15
r_2 = ∞
d_2 = 1.0
r_3 = −80.63
d_3 = 1.0          n_2 = 1.49216        ν_2 = 57.5
r_4 = 48.593 (aspherical surface)
d_4 = 2.5
r_5 = 28.072
d_5 = 6.0          n_3 = 1.51633        ν_3 = 64.15
r_6 = −43.339
    E = 0.1519 × 10^−4,     F = −0.65247 × 10^−7
    G = 0.11907 × 10^−8,    H = −0.68444 × 10^−11
    f = 64.798,    f_1 = −61.449,    f_2 = 33.968
        |f/f_1| = 1.05,          f/f_2 = 1.91
                    Embodiment 2
r_0 = ∞
d_0 = 1.12
r_1 = 140.0
d_1 = 79.65        n_1 = 1.51633        ν_1 = 64.15
r_2 = ∞
d_2 = 0.5
r_3 = ∞
d_3 = 1.0          n_2 = 1.49216        ν_2 = 57.5
r_4 = 19.882 (aspherical surface)
d_4 = 2.2
r_5 = 19.333
d_5 = 6.8          n_3 = 1.51633        ν_3 = 64.15
r_6 = −45.303
    E = 0.11815 × 10^−4,    F = 0.43301 × 10^−8
    G = 0.41544 × 10^−9,    H = −0.56038 × 10^−11
    f = 64.799,    f_1 = −40.397,    f_2 = 27.219
        |f/f_1| = 1.60,          f/f_2 = 2.38
                    Embodiment 3
r_0 = ∞
d_0 = 1.12
```

```
                    -continued
r_1 = 140.0
d_1 = 79.65        n_1 = 1.51633        ν_1 = 64.15
r_2 = ∞
d_2 = 0.1
r_3 = 116.55
d_3 = 1.0          n_2 = 1.64769        ν_2 = 33.8
r_4 = 16.244 (aspherical surface)
d_4 = 1.5
r_5 = 16.134
d_5 = 7.5          n_3 = 1.51633        ν_3 = 64.15
r_6 = −34.141
    E = 0.11524 × 10^−4,    F = 0.25344 × 10^−7
    G = −0.64391 × 10^−9,   H = 0.8958 × 10^−11
    f = 64.801,    f_1 = −29.256,    f_2 = 22.355
        |f/f_1| = 2.22,          f/f_2 = 2.90
```

In respective embodiments shown in the above, reference symbol $r_0$ represents the focusing surface, reference symbols $r_1, r_2, \ldots$ respectively represent radii of curvature of respective surfaces, reference symbols $d_0, d_1, \ldots$ respectively represent distances between respective surfaces, reference symbols $n_1, n_2, \ldots$ respectively represent refractive indices of the pentagonal roof prism and respective lenses, and reference symbols $\nu_1, \nu_2, \ldots$ respectively represent Abbe's numbers of the pentagonal roof prism and respective lenses.

Figure 2:
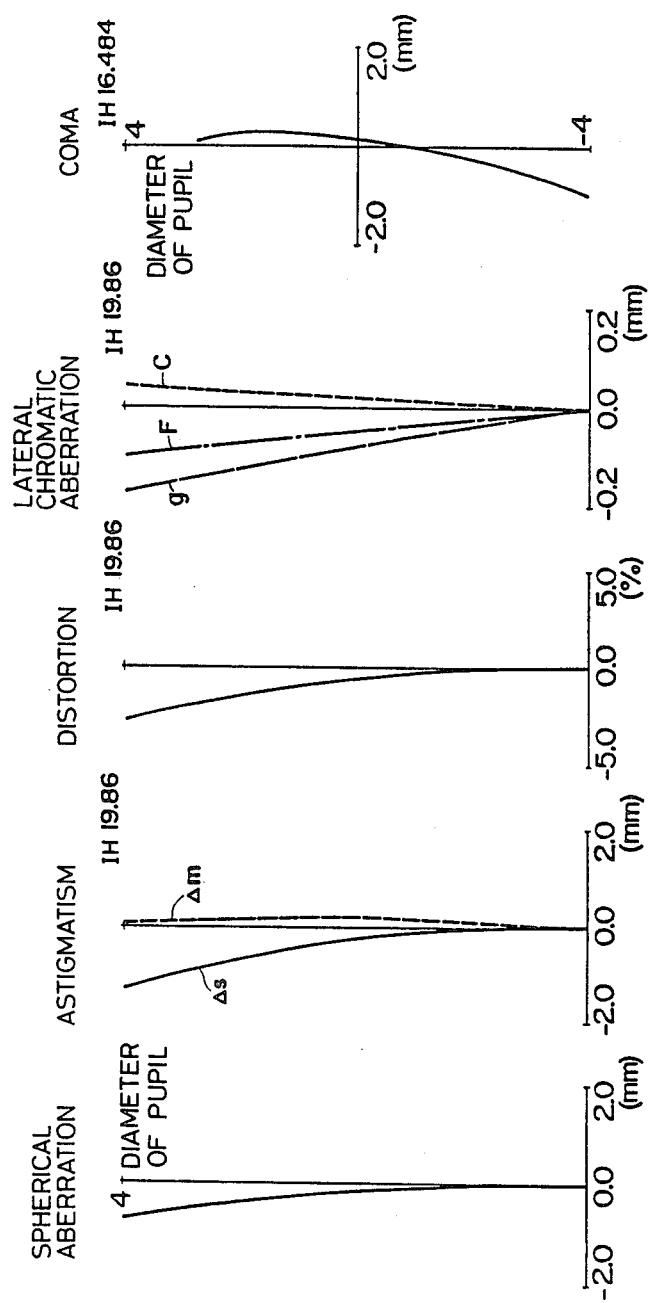
FIG. 2 shows graphs illustrating aberration curves of Embodiment 1 of the present invention.
Figure 3:
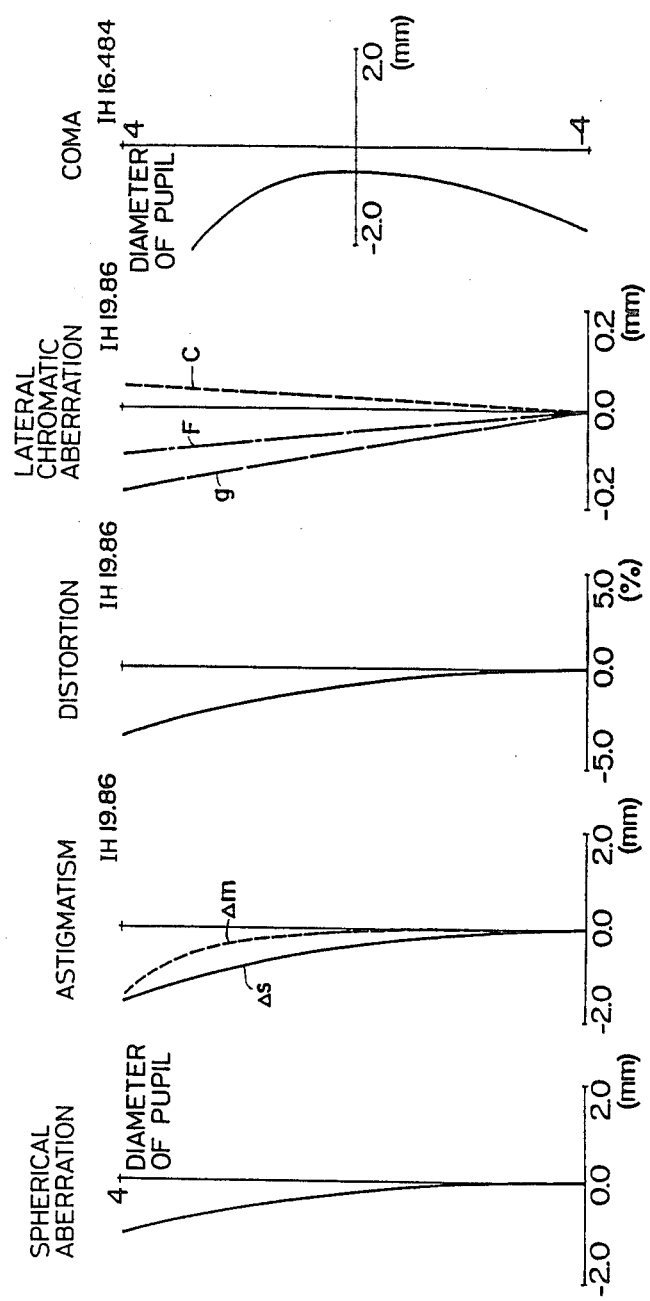
FIG. 3 shows graphs illustrating aberration curves of Embodiment 2 of the present invention.
Figure 4:
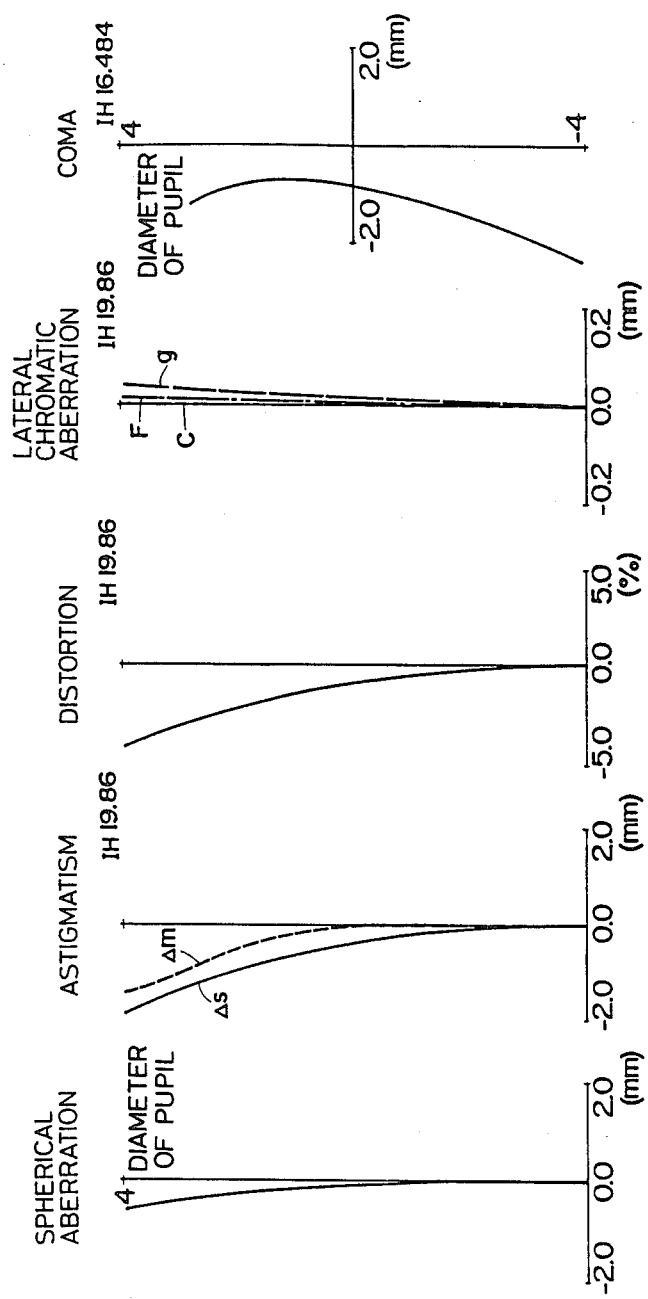
FIG. 4 shows graphs illustrating aberration curves of Embodiment 3 of the present invention.

The diopter of each embodiment is −0.5 diopter. FIGS. 2 through 4 respectively show graphs illustrating aberration curves of Embodiments 1 through 3. Aberration curves shown in said figures are respectively obtained by reverse ray tracing by taking the eye relief as 16.5 mm.

From said figures, it will be understood that, for every embodiment, aberrations are corrected favourably in spite of the fact that the negative lens and the positive lens constituting the eyepiece are respectively arranged to have strong refractive powers.

As an aspherical lens, a plastic lens is often used due to the reasons that forming is easy, the material cost is low, and so forth. However, as a plastic lens tends to be scratched easily, when a plastic lens is to be used at a position where it is exposed to the outside, it is necessary to take suitable measures for protecting the plastic lens, for example, to additionally provide a cover glass or the like. In the present invention, the negative lens having the aspherical surface is provided between the pentagonal roof prism and positive lens and, therefore, it is possible to prevent said negative lens from being scratched even when the above-mentioned measures are not taken.

I claim:

1. A finder optical system for a single-lens reflex camera comprising a pentagonal roof prism and an eyepiece comprising a negative lens and a positive lens and arranged on the light exiting side of said pentagonal roof prism, the surface on the image side of said negative lens being arranged as an aspherical surface.

2. A finder optical system for a single-lens reflex camera according to claim 1 fulfilling the conditions (1) and (2) shown below:

(1) $1.0 < |f/f_1| < 2.3$
(2) $1.8 < f/f_2 < 3.0$ where, reference symbol f represents the focal length of the finder optical system as a whole, reference symbol $f_1$ represents the focal length of the negative lens constituting the eyepiece, and reference symbol $f_2$ represents the focal length of the positive lens constituting the eyepiece.

3. A finder optical system for a single-lens reflex camera according to claim 2 wherein said aspherical surface is expressed by the formula shown below when the x axis is traced in the direction of the optical axis and the y axis is traced in a plane perpendicular to the optical axis taking the intersecting point between the aspherical surface and optical axis as the origin and taking the light advancing direction as "plus":

$$x = \frac{Cy^2}{1 + \sqrt{1 - C^2 y^2}} + Ey^4 + Fy^6 + Gy^8 + Hy^{10}$$

where, $C = 1/r_4$ (where, reference symbol $r_4$ represents the radius of curvature of the vertex portion of the aspherical surface), and reference symbols E, F, G, H, . . . respectively represent the coefficients of aspherical surface of the fourth order, sixth order, eighth order, tenth order and so on.

4. A finder optical system for a single-lens reflex camera according to claim 3 having the following numerical data:

---

$r_0 = \infty$
$d_0 = 1.12$
$r_1 = 140.0$
$d_1 = 79.65$     $n_1 = 1.51633$     $\nu_1 = 64.15$
$r_2 = \infty$
$d_2 = 1.0$
$r_3 = -80.63$
$d_3 = 1.0$     $n_2 = 1.49216$     $\nu_2 = 57.5$
$r_4 = 48.593$ (aspherical surface)
$d_4 = 2.5$
$r_5 = 28.072$
$d_5 = 6.0$     $n_3 = 1.51633$     $\nu_3 = 64.15$
$r_6 = -43.339$
$E = 0.1519 \times 10^{-4}$,     $F = -0.65247 \times 10^{-7}$
$G = 0.11907 \times 10^{-8}$,     $H = -0.68444 \times 10^{-11}$
$f = 64.798$,     $f_1 = -61.449$,     $f_2 = 33.968$
$|f/f_1| = 1.05$,     $f/f_2 = 1.91$

--- where, reference symbol $r_0$ represents the focusing surface, reference symbols $r_1, r_2, \ldots$ respectively represent radii of curvature of respective surfaces, reference symbols $d_0, d_1, \ldots$ respectively represent distances between resepctively surfaces, reference symbols $n_1, n_2, \ldots$ respectively represent refractive indices of the pentagonal roof prism and respective lenses, and reference symbols $\nu_1, \nu_2, \ldots$ respectively represent Abbe's numbers of the pentagonal prism and respective lenses.

5. A finder optical system for a single-lens reflex camera according to claim 3 having the following numerical data:

---

$r_0 = \infty$
$d_0 = 1.12$
$r_1 = 140.0$
$d_1 = 79.65$     $n_1 = 1.51633$     $\nu_1 = 64.15$
$r_2 = \infty$
$d_2 = 0.5$
$r_3 = \infty$
$d_3 = 1.0$     $n_2 = 1.49216$     $\nu_2 = 57.5$
$r_4 = 19.882$ (aspherical surface)
$d_4 = 2.2$
$r_5 = 19.333$
$d_5 = 6.8$     $n_3 = 1.51633$     $\nu_3 = 64.15$
$r_6 = -45.303$
$E = 0.11815 \times 10^{-4}$,     $F = 0.43301 \times 10^{-8}$
$G = 0.41544 \times 10^{-9}$,     $H = -0.56038 \times 10^{-11}$
$f = 64.799$,     $f_1 = -40.397$,     $f_2 = 27.219$
$|f/f_1| = 1.60$,     $f/f_2 = 2.38$

--- where, reference symbol $r_0$ represents the focusing surface, reference symbols $r_1, r_2, \ldots$ respectively represent radii of curvature of respective surfaces, reference symbols $d_0, d_1, \ldots$ resepctively represent distances between respective surfaces, reference symbols $n_1, n_2, \ldots$ respectively represent refractive indices of the pentagonal roof prism and respective lenses, and reference symbols $\nu_1, \nu_2, \ldots$ respectively represent Abbe's numbers of the pentagonal roof prism and respective lenses.

6. A finder optical system for a single-lens refrex camera according to claim 3 having the following numerical data:

---

$r_0 = \infty$
$d_0 = 1.12$
$r_1 = 140.0$
$d_1 = 79.65$     $n_1 = 1.51633$     $\nu_1 = 64.15$
$r_2 = \infty$
$d_2 = 0.1$
$r_3 = 116.55$
$d_3 = 1.0$     $n_2 = 1.64769$     $\nu_2 = 33.8$
$r_4 = 16.244$ (aspherical surface)
$d_4 = 1.5$
$r_5 = 16.134$
$d_5 = 7.5$     $n_3 = 1.51633$     $\nu_3 = 64.15$
$r_6 = -34.141$
$E = 0.11524 \times 10^{-4}$,     $F = 0.25344 \times 10^{-7}$
$G = -0.64391 \times 10^{-9}$,     $H = 0.8958 \times 10^{-11}$
$f = 64.801$,     $f_1 = -29.256$,     $f_2 = 22.355$
$|f/f_1| = 2.22$,     $f/f_2 = 2.90$

--- where, reference symbol $r_0$ represents the focusing surface, reference symbols $r_1, r_2, \ldots$ respectively represent radii of curvature of respective surfaces, reference symbols $d_0, d_1, \ldots$ respectively represent distances between resepctive surfaces, reference symbols $n_1, n_2, \ldots$ respectively represent refractive indices of the pentagonal roof prism and respective lenses, and reference symbols $\nu_1, \nu_2, \ldots$ respectively represent Abbe's numbers of the pentagonal roof prism and respective lenses.

* * * * *